Jan. 13, 1925.

W. G. SCHUTZA

LOCKING DEVICE

Filed Sept. 29, 1923

1,523,086

Inventor

William G. Schutza.

Patented Jan. 13, 1925.

1,523,086

UNITED STATES PATENT OFFICE.

WILLIAM G. SCHUTZA, OF WEST, TEXAS.

LOCKING DEVICE.

Application filed September 29, 1923. Serial No. 665,733.

*To all whom it may concern:*

Be it known that I, WILLIAM G. SCHUTZA, residing in the city of West, county of McLennan, and State of Texas, and a citizen of the United States, have invented certain new and useful Improvements in Locking Devices, of which the following is a specification, reference being had to the accompanying drawing, forming a part thereof.

My invention relates to locking devices and has for its object to provide efficient means for locking the fly wheel of an automobile against rotation, thereby preventing the automobile from being moved by its own power when the locking means is applied.

With the above described object and other objects hereinafter explained in view, my invention consists in the construction and combination of parts hereinafter described and claimed.

Referring to the drawings.

Figures 1, 2:
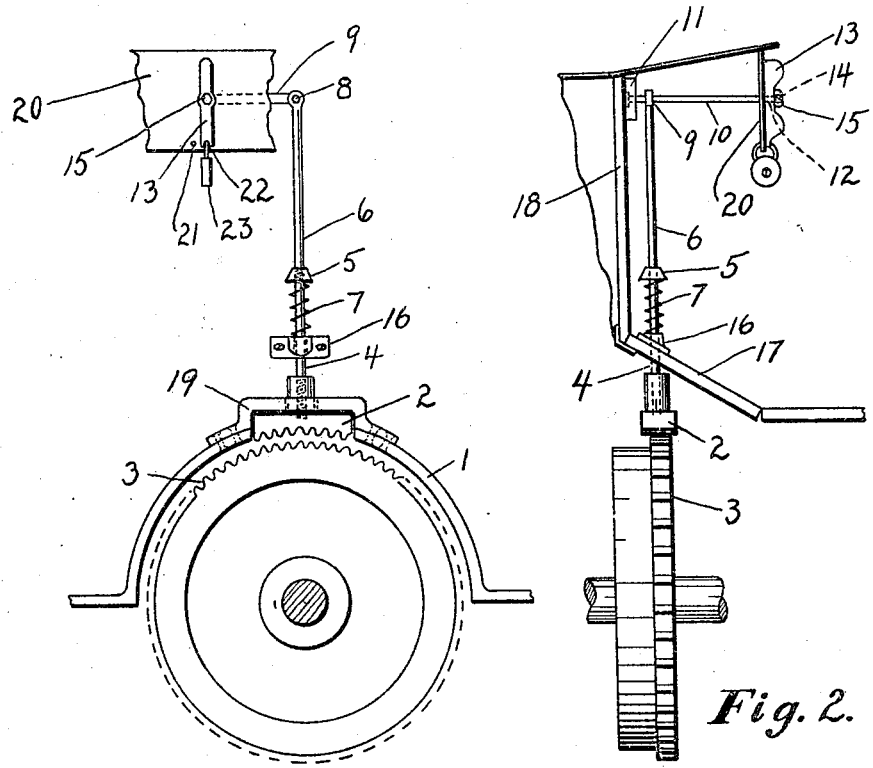
Fig. 1 shows a front elevation view of an ordinary motor fly wheel and housing with my device applied thereto.
Fig. 2 is a side elevation view of the same with the fly wheel housing and brace removed.

In the drawings 1 indicates the fly wheel housing or transmission case of an automobile. 2 indicates an arc segment having internal teeth which correspond and mesh with the teeth 3 of the fly wheel. The rod 4 is attached to the upper side of the segment 2 by means of screw threads. A cuff 5 screw threaded internally is placed upon the upper end of rod 4 which is screw threaded a suitable distance, and the yoke 6 is then screwed into place. A spring 7 on rod 4 is interposed between cuff 5 and the bearing 16 mounted on the toe board 17. This spring 7 serves to hold the toothed segment 2 away from the teeth 3 of the fly wheel. The yoke 6 is attached by means of a bolt 8 to an arm 9 which is welded in the proper position to the rod 10. One end of the rod 10 is arranged in a suitable bearing 11 which is fastened to the inside of the dash 18. The other end of the rod 10 is squared at 12 to fit into a square hole in the handle 13. Beyond the square end are screw threads 14 and a nut 15 is screwed in place to hold the handle 13 from becoming disengaged. A lock 23 goes through the end of the handle 13 and a hole 22 in the instrument board 20. In this position, the segment 2 is held disengaged from the gear teeth 3 and there locked. When the handle 13 is turned clockwise, the lock 23 is put through the hole 21 in the instrument board 20, and in this position the teeth of segment 2 are engaged with and securely lock the teeth 3 of the fly wheel.

The cap 19, shown in Figure 1, may be used to brace the fly wheel housing 1 where the part of the said housing is removed to give space for the segment 2. However, it will be understood that several variations in the method of mounting the segment 2 must be used to correspond to the different designs in the fly wheel housings.

Figures 3, 4:
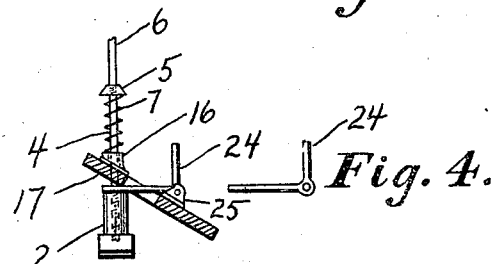
Fig. 3 is a partial sectional view of an accessory pedal as means for aiding the operation of the lock.
Fig. 4 is a detail of the pedal.

The pedal 24 as shown in Figures 3 and 4 may be used to aid in depressing the segment 2 against the tension of the spring 7. The pedal 24 is mounted in the bracket 25 which is rigidly fastened to the toe board 17. The use of this pedal permits the operation of the locking device without the use of excessive pressure on the handle 13.

It is to be understood that the invention is not limited to the particular arrangement shown, as any convenient method for locking may be employed.

Having thus described my invention what I claim is:—

In a locking device for an automobile, a toothed segment engaging the teeth of a fly wheel, means for raising or lowering said segment, consisting of screwthreaded rods attached to said segment and the locking means respectively and having a foot pedal rigidly attached to the toe board and adapted to be pressed upon the segment as a means for overcoming the tension of the spring and means for locking said segment in mesh with the teeth of the fly wheel, thereby preventing the automobile from being moved by its own motive power.

In testimony whereof I hereunto affix my signature.

WILLIAM G. SCHUTZA.